United States Patent

Thaler et al.

Patent Number: 5,983,329
Date of Patent: *Nov. 9, 1999

[54] CACHING VIRTUAL MEMORY LOCKS

[75] Inventors: Wolfgang J. Thaler; Jonathan L. Bertoni, both of Mountain View, Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/643,262

[22] Filed: May 3, 1996

[51] Int. Cl.$^6$ ......................................................... G06F 12/14
[52] U.S. Cl. ........................... 711/163; 711/145; 711/150; 711/152
[58] Field of Search ............................... 395/413, 421.06, 395/182.03, 472, 670, 468, 445, 490, 481, 421.08, 728, 680, 150, 151, 152; 711/163; 707/8

[56] References Cited

U.S. PATENT DOCUMENTS

| | | | |
|---|---|---|---|
| 4,716,528 | 12/1987 | Crus et al. | 711/200 |
| 5,063,499 | 11/1991 | Garber et al. | 395/500 |
| 5,155,843 | 10/1992 | Stamm et al. | 714/5 |
| 5,285,528 | 2/1994 | Hart | 395/726 |
| 5,404,482 | 4/1995 | Stamm et al. | 711/145 |
| 5,410,700 | 4/1995 | Fecteau et al. | 709/100 |
| 5,485,607 | 1/1996 | Lomet et al. | 707/8 |
| 5,537,574 | 7/1996 | Elko et al. | 711/141 |
| 5,537,645 | 7/1996 | Henson et al. | 709/300 |

Primary Examiner—Eddie P. Chan
Assistant Examiner—Than V. Nguyen
Attorney, Agent, or Firm—Beyer & Weaver, LLP

[57] ABSTRACT

A virtual memory lock is placed upon a region of physical memory within a computer system in response to an I/O request through the use of a range lock. Each range lock represents pages of virtual memory that are present and locked in the physical memory. The range locks are cached in memory and used subsequently to process a lock or unlock request, thus avoiding constant locking or unlocking. Regions of memory that are locked, but have no outstanding I/O operations may still have a range lock existing corresponding to that region. If no range lock exists for an I/O request, the virtual memory lock function is called and a range lock is created for that region. If a range lock exists, its usage counter is incremented. Upon notification of the completion of an I/O operation upon a particular region, the usage counter for the range lock corresponding to that region is decremented, and the range lock continues to exist even if there are no outstanding I/O requests for that region. The range locks may be stored and accessed through the use of a hash table and associated hash function. Physical memory is freed up upon receiving a low memory request or a notification of released pages by a search of the cached range locks to determine which range locks to remove. For these range locks to be removed, the pages in physical memory corresponding to these range locks will be unlocked and the range locks themselves will be removed from memory.

27 Claims, 8 Drawing Sheets

Figure 10 ved, a virtual page range is identified that includes the
CACHING VIRTUAL MEMORY LOCKS

FIELD OF THE INVENTION

The present invention relates generally to a virtual memory locking technique for use within a computer system. More specifically, a locking technique for use with virtual memory that uses caching of the locks is described.

BACKGROUND OF THE INVENTION

Many computer systems in use today use some form of virtual memory scheme in order to address larger sections of memory than are available as physical memory (sometimes termed "real" memory) within the computer itself. Such a virtual memory scheme may allow a central processing unit (CPU) to address more memory than what may be available as random access memory located within the computer. This scheme allows data and instructions to be relocated in an organized fashion. In addition to providing solutions for problems of relocating data and instructions in memory, a virtual memory scheme also allows the illusion of a large, fast memory to be provided at lower hardware cost. The purpose of a virtual memory scheme is to allow a much greater flexibility in the physical placement of a particular datum within a possibly multi-level memory hierarchy. A multi-level memory hierarchy is an ordered collection of physical memory systems, each one typically larger and slower (and hence cheaper per byte) than the proceeding one. A virtual memory scheme typically involves the use of pages, in which a page from virtual memory may be brought into physical memory and then rewritten to a hard disk or the like when finished. Such an activity is also called page swapping.

However, in order to perform input/output (I/O) operations most virtual memory subsystems require page by page locking of the region undergoing I/O. This locking and unlocking for a page may occur each time an I/O operation begins and ends. This process can be quite expensive. For an operating system that is highly parallel and performs lots of I/O, it can be extremely costly to lock and release a page each time an I/O operation either requests a page, or is finished with a page, respectively. For I/O operations, many prior art virtual memory schemes acquire and release a lock on virtual memory pages each time an I/O operation is initiated and then completed. This prior art technique results in increased CPU overhead because creating and removing these I/O locks is very expensive. For example, in certain virtual memory subsystems, roughly 75% of CPU overhead for certain I/O operations can be attributed to this page by page locking.

Thus, the swapping in and out of pages, and the corresponding creation and release of leeks on a page by page basis can result in tremendous overhead. To reduce this overhead, it is desirable to keep a page in physical memory and prevent unmapping from occurring unless necessary. In other words, in order to reduce CPU overhead costs, it would be desirable to force a continuous assignment of a physical page to a logical page in virtual memory until the memory space is unneeded or otherwise required. It would also be desirable to have a locking technique for use with virtual memory subsystems that would retain the locks on a region of virtual memory between I/O operations, and would allow processes to locate and utilize cached representations of locks efficiently.

SUMMARY OF THE INVENTION

One aspect of the present invention relates to a method of placing a virtual memory lock upon a region of physical memory within a computer system in response to an input/output (I/O) request. For a computer system with a virtual memory distinct from physical memory, it is often necessary to lock pages of virtual memory in the physical memory during I/O operations. The present invention provides a facility for creating a plurality of range locks, each range lock representing corresponding pages of virtual memory that are present in the physical memory and that are locked in the physical memory. These range locks may be cached in memory and used subsequently to process a lock or unlock request. Regions of memory that are locked, but have no outstanding I/O operations may still have a range lock existing corresponding to that region. When an I/O request that includes a virtual address range corresponding to a region in virtual memory is received a virtual page range that includes the requested virtual address range is identified. Then, it is determined whether a range lock exists that represents the identified virtual page range, a usage counter associated with the range lock is incremented in order to indicate that the I/O request is now outstanding for the identified virtual page range.

If a range lock that covers the requested range does not exist, then the virtual memory subsystem is called to apply a virtual memory lock to the requested range thereby creating a range lock that corresponds to the newly locked region. The range locks may be stored and accessed through any suitable mechanism. In one preferred embodiment, a hash table is used to store the range locks.

One significant advantage of the present invention is that upon notification of the completion of an I/O operation, it may not be necessary to call the virtual memory subsystem in order to unlock the region that was in use. Another aspect of the present invention provides a method that receives an I/O completion notification that includes a virtual address range corresponding to a region in virtual memory. When received, a virtual page range is identified that includes the requested virtual address range and identifies at least one page of virtual memory. Then, it is determined whether a range lock exists that represents the identified virtual page range. When it is determined that a range lock exists that represents the identified virtual page range, the method decrements a usage counter associated with the range lock in order to indicate that the I/O request is no longer outstanding for the identified virtual page-range.

Another aspect of the present invention allows physical memory to be freed up upon receiving a request due to low memory or upon receiving notification of released pages. For a low memory request, the method will search through the stored range locks and will determined which range locks represent regions of virtual memory that are not in use. For released pages, the method will determine which stored range locks correspond to and overlap the pages needing to be released. In either case, for these range locks that are determined, the pages in physical memory corresponding to these range locks will be unlocked and the range locks themselves will be removed from memory.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention uses a memory caching technique in order to retain the locks on a region of virtual memory between (input/output) I/O operations. These cached locks may then be located and utilized efficiently by later operations wishing to lock a region. The locking technique uses the concept of a range lock to represent a lock that is in place upon a range of virtual memory. This range lock is created and will exist for a particular range in virtual memory during I/O operations to that range. It will not necessarily be created and destroyed each time an I/O operation is initiated or is completed. These range locks are cached and organized in memory in an efficient manner such that they may be accessed and utilized with a low CPU overhead cost. In other words, for multiple I/O operations, corresponding pages in virtual memory will be locked once and will remain locked unless it is necessary that the region be unlocked. These range locks represent an I/O lock upon a region. There are other different low-level locks that may also be present on a page-by-page basis. They include a shared-exclusive lock that allows one to gain exclusive access to a page in order to destroy it, a lock to implement the I/O lists for paging, and special locks that control the right to apply locks.

Figure 1:
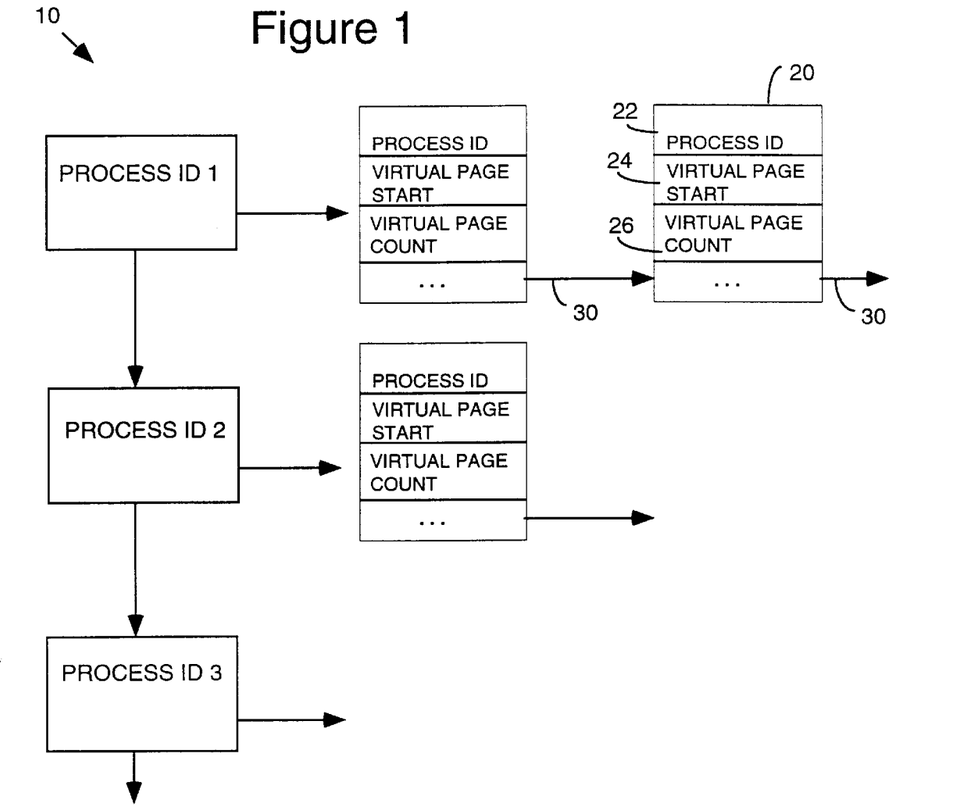
FIG. 1 shows conceptually how a set of cached range locks for various regions of virtual memory correspond to particular processes within the operating system of a computer.

FIG. 1 at 10 shows conceptually how a set of these range locks may be associated with a particular process within a computer system. Shown in particular are a group of processes identified as Process Id 1, Process Id 2 and Process Id 3. Each of these processes represent a process or program running on the CPU within the computer system. Each process may also have associated with it any number of threads. Each of these processes also represents a unique virtual address space that may have certain regions of virtual memory locked at a given time. These regions of virtual memory may be temporarily locked in physical memory because the process needs access to the information (data, program instructions) contained in the virtual memory. The regions of virtual memory that are locked by the process may each be represented conceptually by a data structure called a range lock. Each process may have a corresponding set of range locks 20 as shown.

Because each virtual address space within virtual memory will be unique, each virtual address space has associated with it a set of range locks that lock a unique but possibly overlapping range within virtual memory. Shown for Process Id's 1, 2 and 3 are a subset of their respective range locks. Process Id 1 may have two locks on virtual memory and these are represented by the two range locks shown. Likewise, Process Id 2 may have one outstanding lock on virtual memory that is represented by its single associated range lock 20. Process Id 3 currently has no outstanding locks on virtual memory and as such is not associated with any range lock. It should be appreciated that FIG. 1 shows one possible conceptual illustration of how range locks may be grouped in sets and then associated with a particular process. A wide variety of techniques may be used to group and organize these range locks. By way of example, one particular method for organizing, storing, and accessing these range locks will be discussed below with reference to FIG. 4. Alternatively, these range locks may be organized as sub-locks in a sub-lock list. Such a technique is described in U.S. Patent Application "Flexible Range Locking for Shared Resource", by Jonathan L. Bertoni, filed on Feb. 29, 1996, Ser. No. 08/607,965, now U.S. Pat. No. 5,761,659 and is hereby incorporated by reference in its entirety.

Figure 2:
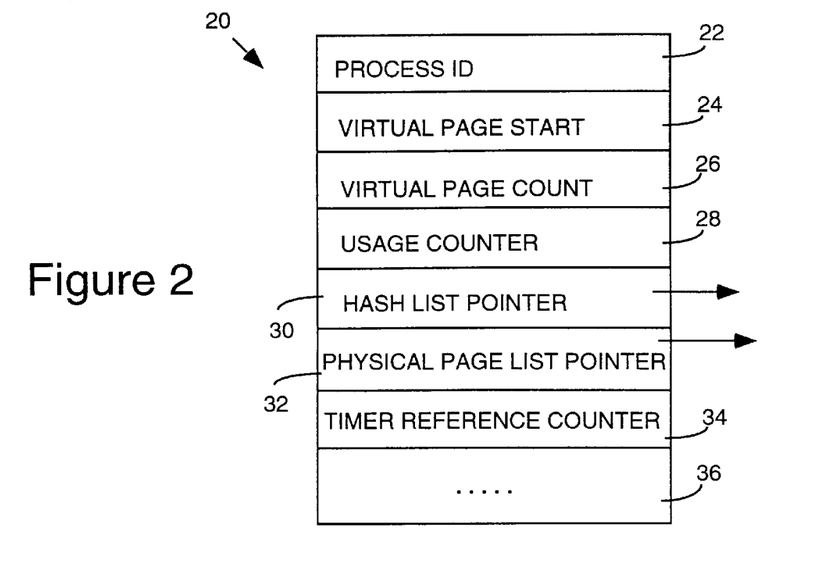
FIG. 2 shows symbolically a range lock according to one embodiment of the present invention that is used to represent a lock upon a region of virtual memory.

FIG. 2 at 20 shows symbolically one embodiment of a range lock suitable for use in the locking arrangement shown in FIG. 1. Once a process has placed an I/O lock upon a page range within virtual memory a range lock 20 may be used to represent this I/O lock conceptually. A range lock 20 has various fields associated with it that contain information related to the lock on virtual memory and the organization and accessing of the range locks.

The illustrated embodiment of the range lock 20 includes a number of fields that may be implemented using any suitable data structure. The fields includes a Process Identifier, a Virtual Page Start and a Virtual Page Count. The Process Identifier field 22 contains the identification for the process with which this range lock is associated. Alternatively, this may also be the virtual address space identifier. The Virtual Page Start field 24 represents the page within virtual memory at which the locked region begins. The Virtual Page Count field 26 represents the number of pages in virtual memory that are currently locked that begin at the Virtual Page Start. p For example, if the field Virtual Page Start has a value of 10, and the field Virtual Page Count has the value of four, this indicates that the pages in virtual memory that are locked range from page 10 to page 13. The field Usage Counter 28 represents how many outstanding I/O operations are present for this range. However, if the Usage Counter has a value of zero, indicating that no I/O operations are outstanding, this range lock will still exist and that region of virtual memory corresponding to this range lock will still be locked. In this fashion, the constant creating and deletion of locks based upon the initiation and completion of I/O operations may be avoided. The field Hash List Pointer 30 contains a pointer to the next range lock in a given set of range locks, thus forming a linked list. For example, referring back to FIG. 1, it can be seen that the first range lock 20 for Process Id 1 has a hash list pointer 30 that points to the second range lock for that Process Id 1. Likewise, the Hash List Pointer 30 for the final range lock is associated with a nil pointer because it does not point to a next range lock. The field Physical Page List Pointer 32 is a pointer that points to a list of all of the physical pages in main memory that are mapped to by the pages in virtual memory corresponding to this range. The field Timer Reference Counter 34 is a counter that represents over time the number of instances in which an I/O operation seeks to lock this range. It is incremented each time an I/O operation tries to lock this range and may be decremented or set equal to zero if a request is made to free physical memory. The Timer Reference Counter is used to keep track over time of the usage of a particular range lock and helps to indicate whether a particular range lock has had a low frequency of use and may then be removed.

Figure 3:
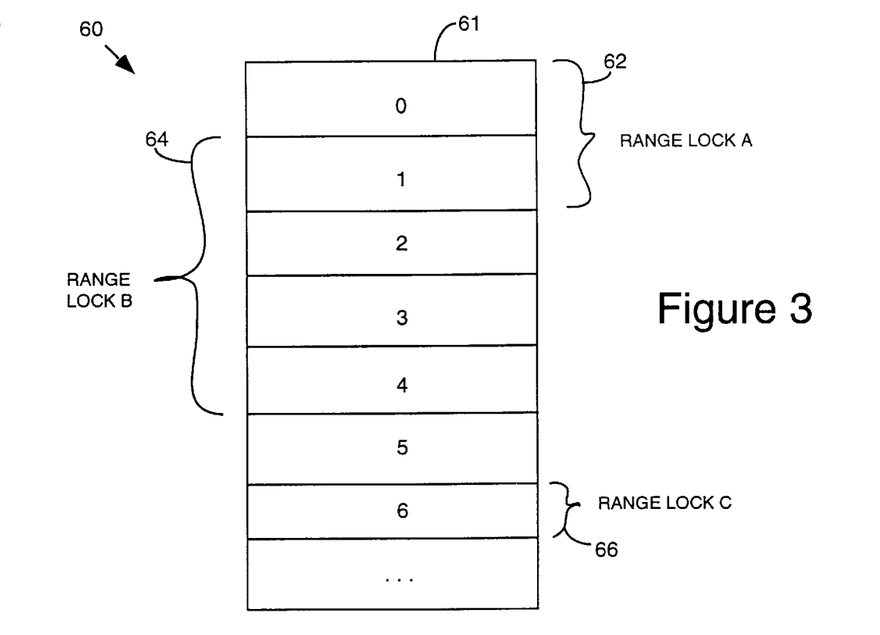
FIG. 3 diagrammatically shows a region of virtual memory for a computer system and a variety of virtual memory locks placed upon this region that are represented by various range locks.

FIG. 6 at 60 shows conceptually a region of virtual memory for a computer system that has various virtual memory locks applied to it. As will be appreciated by those skilled in the art, the size of a locked page may vary significantly from system to system. Shown in particular is a virtual memory region 61 that ranges from 0k up to X k in pages having length of 8k each. A lock 62 has been applied to pages 0 to 1 of this virtual memory and is represented by a range lock A. A second lock 64 has been applied to this virtual memory and is represented by a range lock B. As shown, range lock B corresponds to pages 1–4 and range locks A and B overlap with each representing a lock upon page 1 of the virtual memory. Also shown is a lock 66 represented by a range lock C. It should be appreciated that the size of a page within virtual memory may vary greatly, and that any number of locks may be placed upon the virtual memory at arbitrary locations. And although a range lock corresponds to a range of pages within virtual memory that are currently locked, these ranges may overlap. In this fashion, it may be appreciated that a range lock such as illustrated in FIG. 2 at 20 may be used to represent an I/O lock that has been placed upon a range of pages within the virtual memory.

Figure 4:
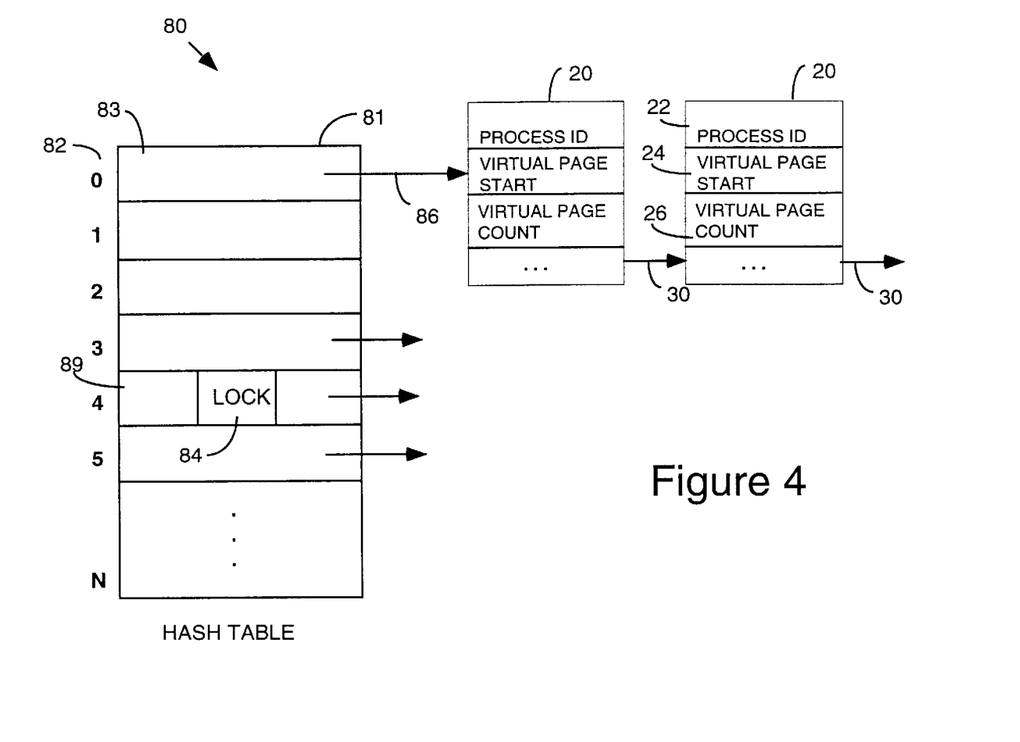
FIG. 4 is a diagrammatic illustration of a hash table for use in accessing a set of range locks according to one embodiment of the present invention.

FIG. 4 shows at 80 a hash table that is used to efficiently organize and access all of the range locks corresponding to a virtual memory. The hash table is made up of a series of cells 81 that contain an associated set of range locks for that cell. A cell is also termed a bucket. The hash table also has an address space 82 that is labeled from 0 to N. This address space 82 is also termed the bucket number and is used to reference a particular bucket. The implementation and use of a hash table will be familiar to one of skill in the art. It should also be appreciated that the organization and accessing of all of the range locks for a virtual memory may also be accomplished by a technique other than the use of a hash table.

Shown in particular in the hash table at Bucket Number 0 is a Bucket 83 that contains two range locks 20. The representation of these range locks within Bucket Number 0 is achieved through the use of a Bucket Pointer 86 that points to a linked list of the range locks that are contained within this bucket. Thus, it can be seen that each bucket has an associated Bucket Pointer 86 that points to a first range lock in a list of range locks. Each successive range lock in this list is accessed by the Hash List Pointer 30 of each range lock 20. One of skill in the art will appreciate that for a given bucket its associated linked list of range locks may be searched in order to find a particular range lock. Each bucket, for example Bucket 89, has a mutex lock variable 84 that may be in a locked or unlocked state. This mutex lock variable when locked prevents the range locks in that bucket from being inserted, deleted or from being searched. This lock may be used while a particular bucket is being processed, as will be described below. In order to increase parallelism, it is also possible to perform some of this work outside of the locked bucket; such a technique will be known to one of skill in the art.

The hash table uses a hash function "f()" which is a function of the Virtual Page Start and Process Identifier. Thus, for a given range lock with a Virtual Page Start and a Process Identifier, these values are used in the hash function to produce a unique value K such that this range lock may be inserted at the bucket corresponding to the value K. Thus, the hash function may be stated mathematically as: K=f (Virtual Page Start, Process Identifier). The value K will range from 0 to N. The length of the hash table may be of any length, although a preferable value for the quantity N may be a power of 2 such as 128 or 256. It will be appreciated by one of skill in the art that an optimum number for the value N may be derived empirically and depends upon the particular computing system for which the hash table is being implemented.

Figure 5:
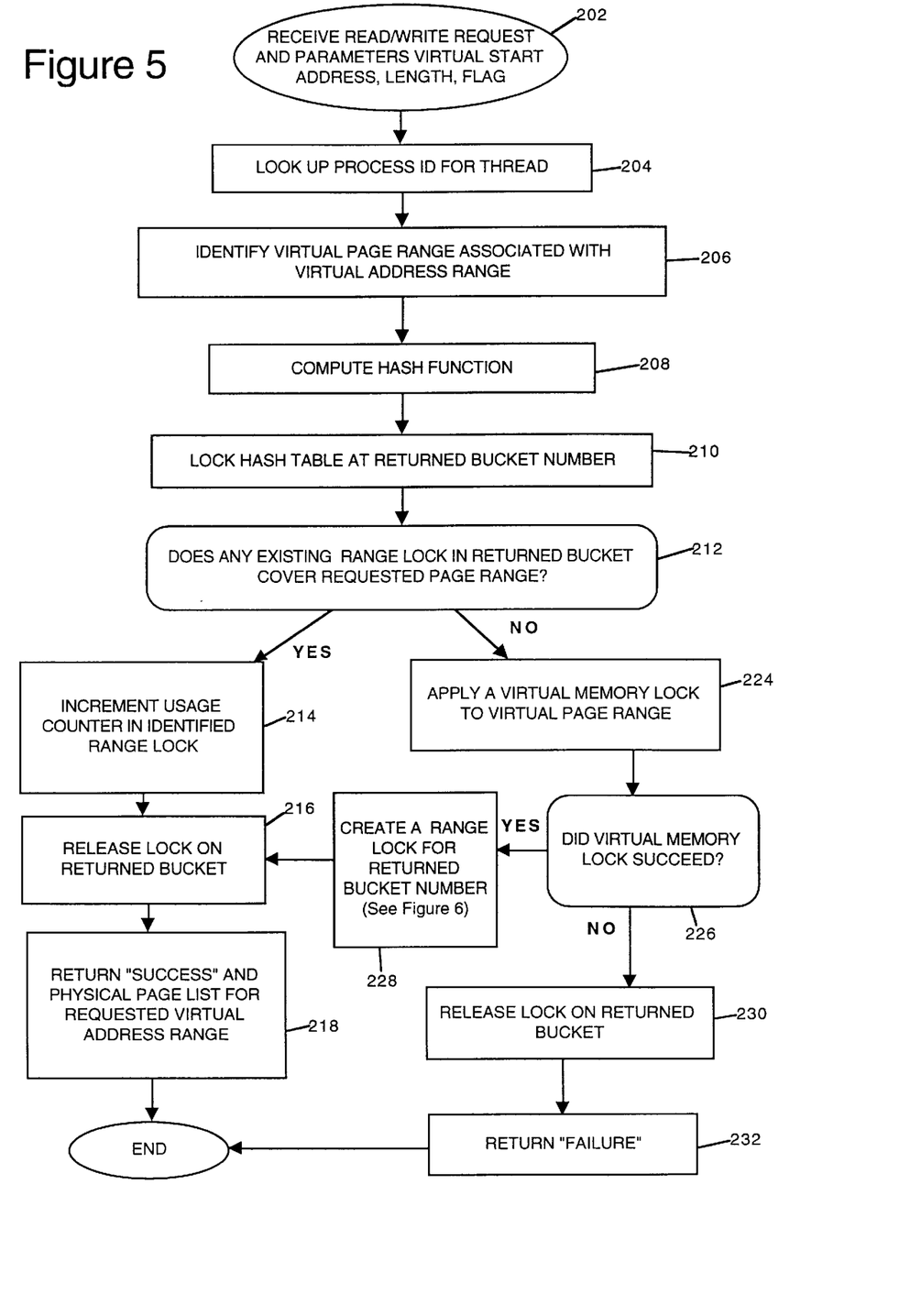
FIG. 5 is a flow chart illustrating a method suitable for implementing a virtual memory lock upon a range of virtual memory in response to a read or write request in accordance with one embodiment of the present invention.

FIG. 5 is a flow chart according to one embodiment of the present invention illustrating how a read/write request may implement an I/O lock upon a region within virtual memory. This read/write request may originate from a thread that is either requesting that data be read from virtual memory or that data within the physical memory of the computer be written to virtual memory. The steps described below illustrate how it may not be necessary to apply a new virtual memory lock to a particular range in certain circumstances, thus reducing CPU overhead.

This I/O request may be to/from a hard disk, tape, optical disk or the like that is considered secondary storage of the computer system. For example, a disk read request will actually write pages from the disk to the physical memory of the computer, while a disk write request will read pages from the physical memory and write them to disk. Thus, when a disk read occurs the system must verify that write access is available to the physical memory, while for a disk write the test is less stringent because the physical memory is only being read.

In step 202 a read/write request is received. Parameters included with this request are a Virtual Start Address, a Length and a Read/Write Flag. The Virtual Start Address indicates a byte address within virtual memory that indicates the beginning of the region that is desired to be locked. The Length is a variable in bytes that indicates the length of the region in virtual memory to be locked. Thus, a virtual address range that begins at the Virtual Start Address and extends for Length number of bytes within the virtual memory is delineated. The Read/Write Flag is a variable that will indicate that either a read or a write request is taking place. Step 204 looks up the Process Identifier associated with the thread or other routine that has made the request.

In step 206 the Virtual Page Range that corresponds to the virtual address range is identified. Any pages within the virtual memory that fall within the range of the virtual address range are identified as part of the Virtual Page Range. For example, if the virtual address range begins midway through page 2 and ends midway through page 6 the Virtual Page Range would extend from page 2 through page 6 inclusive. This Virtual Page Range is identified by a variable Virtual Page Start that denotes the first virtual page within the range, and a variable Virtual Page Count, that denotes the total number of virtual pages within the Virtual Page Range. Thus, a range of pages in virtual memory are identified that correspond to the virtual address range that is desired to be locked.

In step 208 the hash function for this request is computed in order to return a bucket number. This hash function is based upon the Virtual Page Start and the Process Identifier. Thus, a bucket number has been identified that corresponds to a bucket that may contain a range lock corresponding to the current request. In step 210 the hash table is locked for the Returned Bucket Number. This bucket is locked in order to prevent modification of its corresponding list of range locks by another process while this operation is proceeding.

Step 212 tests whether any existing range lock within the returned bucket covers the requested Virtual page Range. This test may be performed by traversing the linked list of range locks corresponding to the returned bucket. For each range lock in the list, it is determined if its corresponding virtual page range covers completely the requested range of the virtual pages to be locked. In other words, the input region virtual address range is compared to the range lock fields Virtual Page Start and Virtual Page Count. If the requested range is covered, this indicates that the requested range has already been locked and a new virtual memory lock need not be applied. In this case, control moves to step 214.

In step 214 the Usage Counter for the identified range lock is incremented by one in order to indicate that one more I/O operation is now outstanding for this range of virtual pages. In step 216 the lock on the Returned Bucket Number is released. In step 218 "success" is returned to the requesting thread and the physical page list for the requested virtual address range is also returned. These physical pages correspond to the virtual memory pages of the requested virtual address range. This physical page list is available by referencing the Physical Page List Pointer of the identified range lock. The request then ends.

Returning now to step 212 in which no existing range lock is found that covers the requested virtual page range, control would transfer to step 224. In this case, no existing lock upon these virtual memory pages exists, therefore a lock must be created. In step 224 the virtual memory subsystem of the computer is called in order to apply a virtual memory lock to each page of the Virtual Page Range that is requested to be locked. This virtual memory lock is a standard function used in virtual memory implementations and will be known to one of skill in the art. Because this step creates new virtual memory locks on a page by page basis, it involves a great deal of CPU overhead.

Step 226 test whether the virtual memory lock applied in step 224 succeeded or not. The lock may not have succeeded due to other conflicting requests or conditions within the computer system. If the lock did succeed, then in step 228 a new range lock is created to represent this newly added virtual memory lock on the Virtual Page Range. This newly created Range lock will be stored in the linked list corresponding to the Returned Bucket Number. This creation of a Range lock will be explained in more detail below with reference to FIG. 6. After step 228, control moves to step 216 and flow continues as described above. If, however, in step 226 the virtual memory lock does not succeed, then control moves to step 230. In step 230 the lock on the returned bucket is released, then in step 232 "failure" is returned to the requesting thread and the request ends.

Figure 6:
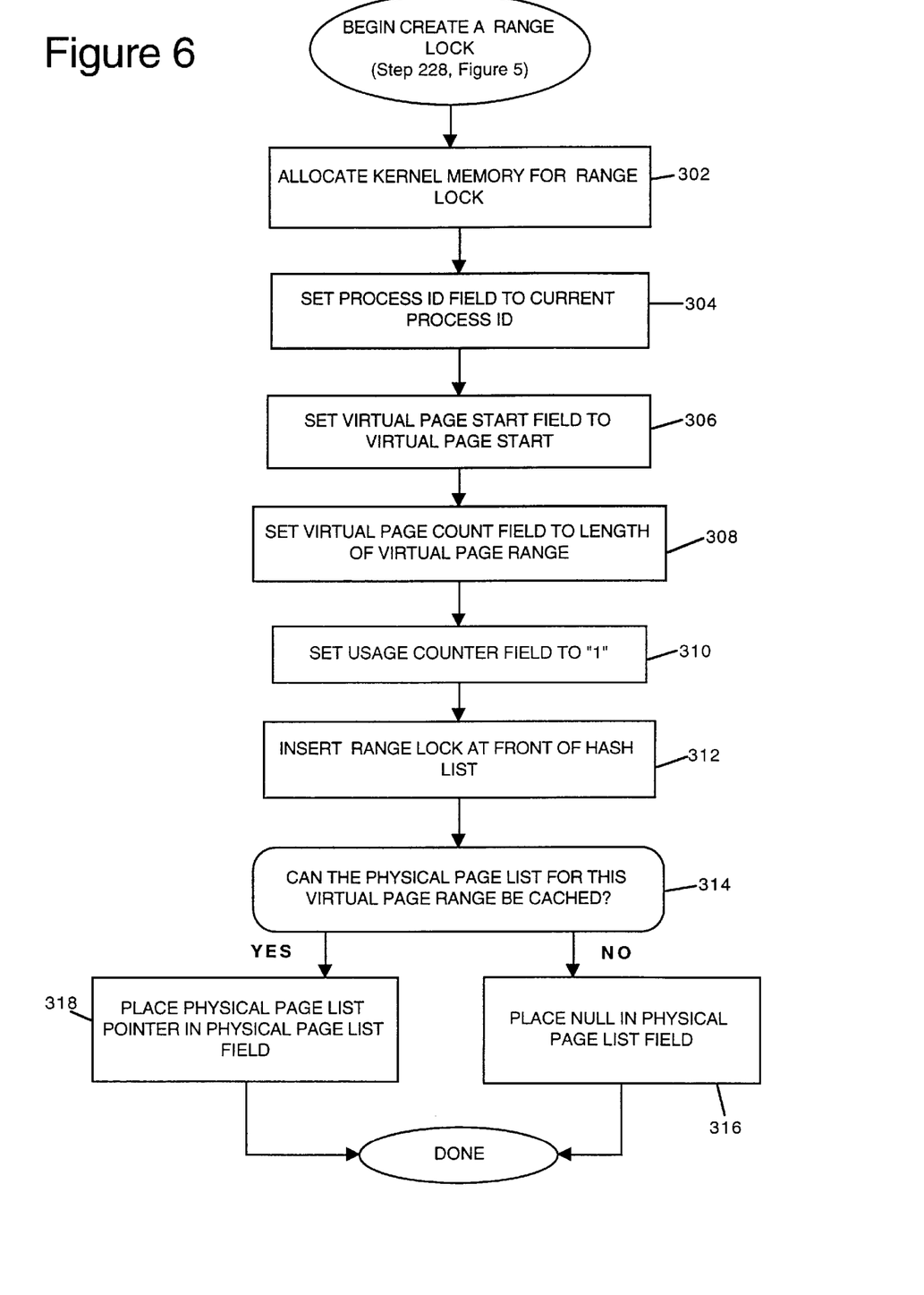
FIG. 6 is a flow chart illustrating a method suitable for creating a range lock that represents a virtual memory lock upon a range of virtual memory.

FIG. 6 illustrates how a range lock may be created according to one embodiment of the present invention. In step 302 kernel memory is allocated for the new range lock. In step 304 the Process Identifier field of the new range lock is set equal to the current Process Identifier. In step 306 the Virtual Page Start field is set equal to the Virtual Page Start for the requested range. In step 308 the Virtual Page Count field is set equal to the Virtual Page Count of the requested range. This virtual page count may be represented in pages or bytes, however a representation in bytes is preferably. In step 310 the Usage Counter field is set equal to "1".

In step 312 this new range lock is inserted at the front of the hash list for the current bucket of the hash table. Step 314 tests whether the physical page list corresponding to this requested Virtual Page Range may be cached. A determination of whether a physical page list may be cached depends upon a particular operating system and may be determined by one of skill in the art. By way of example, the physical page list may not be able to be cached because the segment driver might not have the code implemented in order to do the caching, or because the segment driver may need to relocate pages freely. If the physical page list may be cached, then in step 318 a pointer to this physical page list is placed in the Physical Page List Pointer field of the newly created range lock. On the other hand, if the physical page list may not be cached, then in step 316 a null pointer is placed in this Physical Page List Pointer field. After steps 316 and 318 this step of creating a range lock is done.

Figure 7:
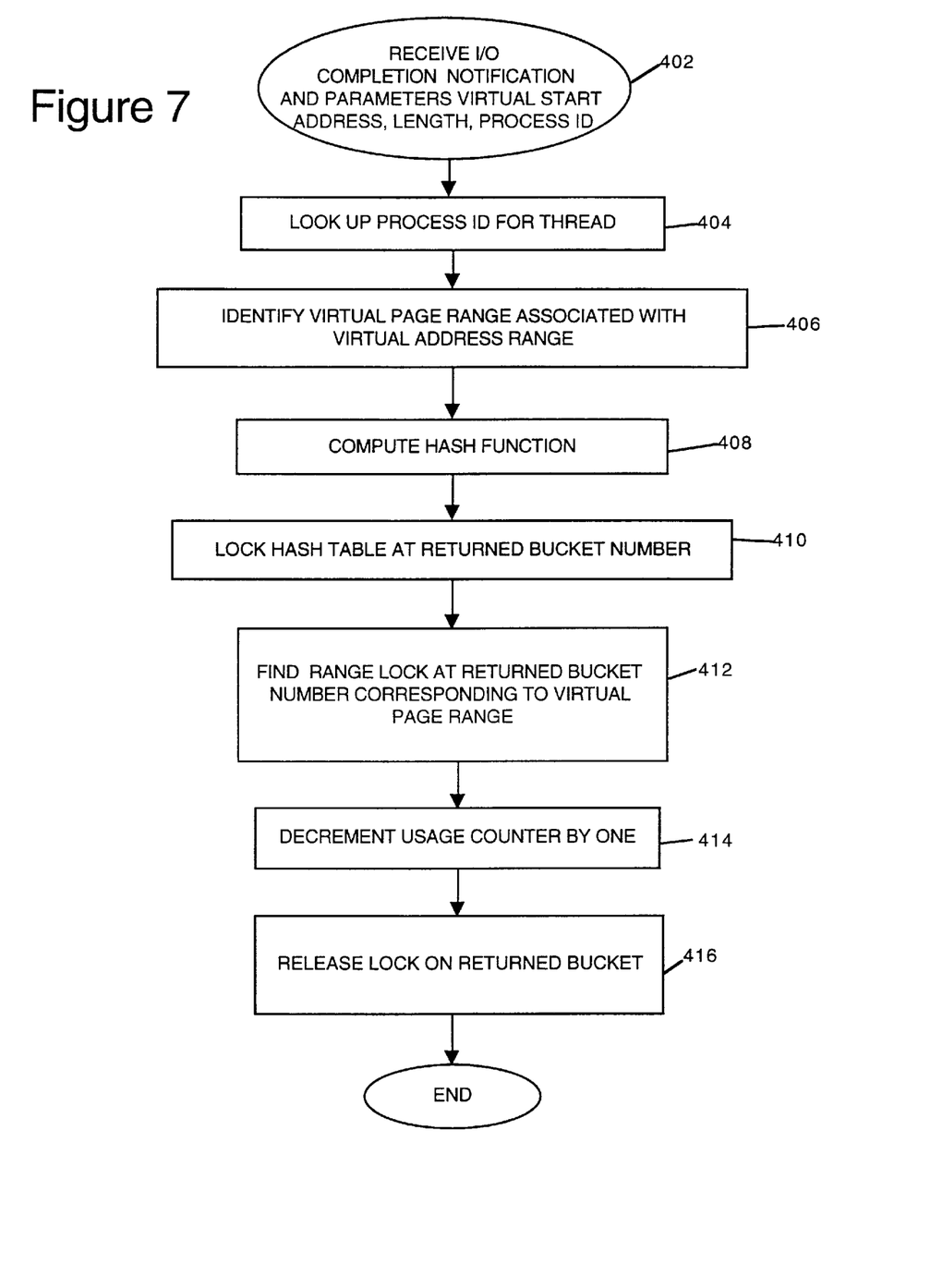
FIG. 7 is a flow chart for releasing a range lock due to a notification of I/O completion.

FIG. 7 is a flow chart showing how the completion of an I/O operation for a particular virtual address range is handled by its corresponding range lock. In step 402 an I/O completion notification is received. Included with this notification are the parameters Virtual Start Address, Length and the Process Identifier corresponding to this I/O request. The parameters Virtual Start Address and Length represent a virtual address range as described above in step 202.

Step 404 looks up the Process Identifier associated with the thread or other routine that has issued the I/O completion notification. Such a notification may be issued when a process has finished either reading from or writing to virtual memory, and no longer as a need for the data contained within that region of virtual memory. In step 406 the Virtual Page Range that corresponds to the virtual address range is identified. Any pages within the virtual memory that fall within the range of the virtual address range are identified as part of the Virtual Page Range. This Virtual Page Range is identified by a variable Virtual Page Start that denotes the first virtual page within the range, and a variable Virtual Page Count, that denotes the total number of virtual pages within the Virtual Page Range. Thus, a range of pages in virtual memory are identified that correspond to the virtual address range that is the subject of the I/O completion notification.

In step 408 the hash function for this request is computed in order to return a bucket number. This hash function is based upon the Virtual Page Start and the Process Identifier. Thus, a bucket number has been identified that corresponds to a bucket that will contain the range lock corresponding to the current request. Because a previous I/O request is now completing, there will be a corresponding range lock for this I/O completion notification. In step 410 the hash table is locked at the Returned Bucket Number. This bucket is locked in order to prevent modification of its corresponding list of range locks by another process while this operation is proceeding.

Step 412 finds the range lock corresponding to the input Virtual Page Range. This range lock may be identified by the procedure described in step 212 above. In step 414 the Usage Counter for this identified range lock is decremented by one. This step of decrementing the Usage Counter indicates that one less I/O operation is now outstanding for the virtual address range corresponding to this range lock. In step 416 the lock upon the current bucket is released and then this procedure ends.

Figure 8:
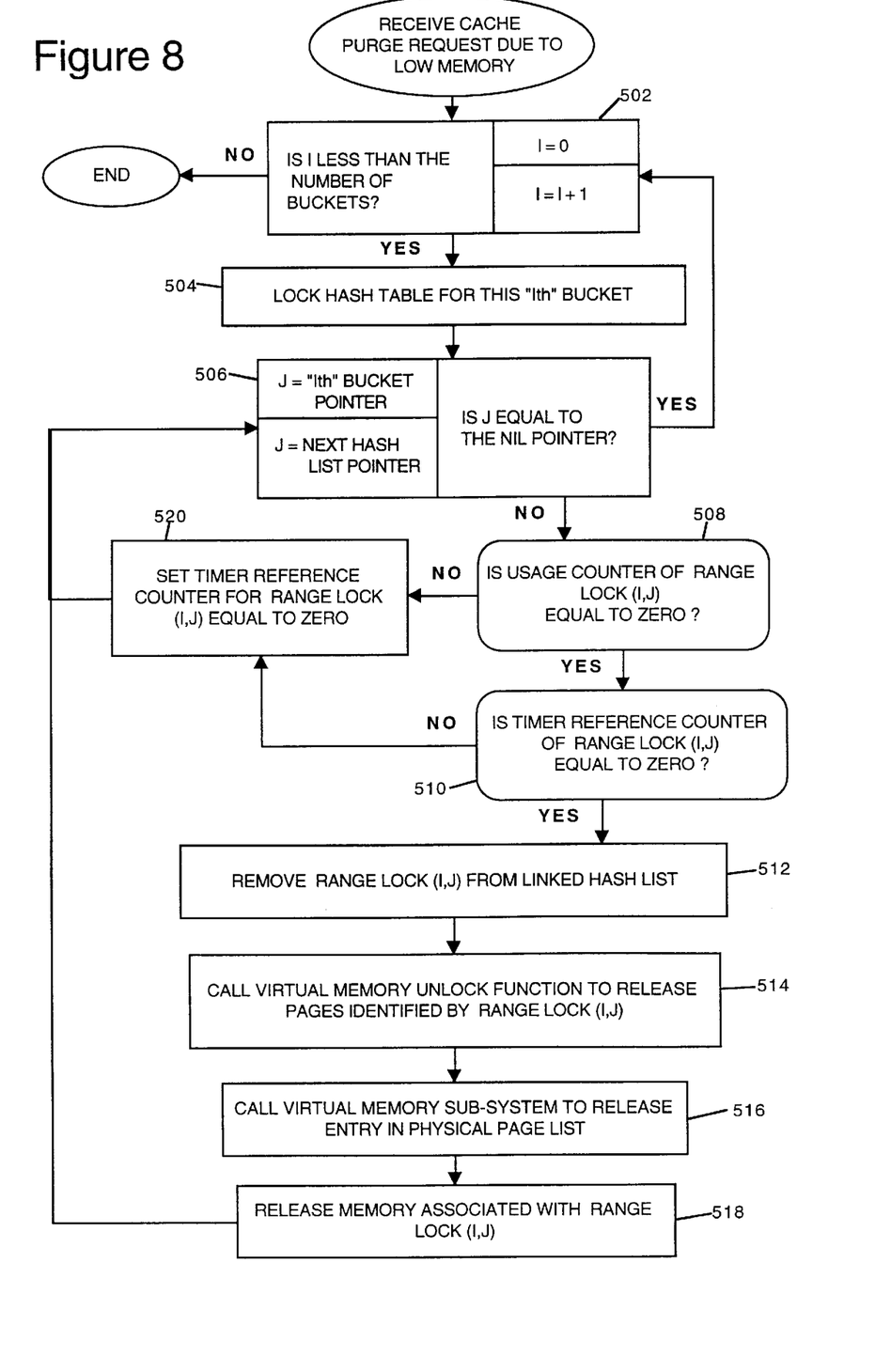
FIG. 8 is a flow chart for removing a virtual memory lock upon a range of virtual memory due to a low physical memory situation within the computer system.

FIG. 8 illustrates a procedure by which current I/O locks on virtual memory may be removed and their corresponding range locks in the cache may be deleted due to low memory. This procedure steps through each of the range locks represented in the hash table and will remove a virtual memory lock and delete the corresponding range lock for those ranges that have no current I/O operation and that have been used infrequently. The fields Usage Counter and Timer Reference Counter of each range lock are used for this purpose. Step 502 initiates a looping structure with an index I that will step through each of the buckets of the hash table. The index I begins at 0 and corresponds to a bucket number on each iteration of the loop. There will be N buckets labeled from 0 to N−1; therefore, when I is equal to N this procedure will end.

In step 504 the hash table at the current bucket number is locked by setting the mutex lock variable to "locked." The current bucket number may be determined by reference to the index I. After step 504 a second looping structure at step 506 is initiated that will step through each of the range locks within the current bucket number. In step 506 the pointer J is first initialized to the Bucket Pointer for the current bucket number. This index J will be incremented after each iteration by setting J equal to the next Hash List Pointer of the current range lock. Once this loop has reached the last range lock for the current bucket then the Hash List Pointer will be nil, this loop will terminate and control will move back up to step 502 where the index I is incremented and the next bucket of the hash table will be processed.

The loop initiated by step 506 begins at a first step 508. The current range lock being processed may be identified with reference to both of the indexes I and J. For example, the current range lock may be identified by range lock (I,J), where the index I refers to a bucket of the hash table and the pointer J points to a range lock within that bucket. Step 508 tests whether the Usage Counter for the range lock (I,J) equals zero. Step 510 tests whether the Timer Reference Counter for the range lock (I,J) is also equal to zero. If either one of these fields is non-zero this indicates that the virtual address range corresponding to this range lock is either in use by an I/O operation or has been used recently. If such is the case, this range will not be unlocked. Accordingly, in step 520 the Timer Reference Counter for the range lock (I,J) is set equal to zero and control returns to step 506 in which the pointer J is incremented to point to the next range lock to be processed.

If, however, both the Usage Counter and the Timer Reference Counter for range lock (I,J) are equal to zero then this virtual address range that is identified by this range lock (I,J) will be unlocked from physical memory and the range lock (I,J) will be deleted. Accordingly, first in step 512 this range lock (I,J) is removed from the linked hash list. Next, in step 514 the unlock function of the virtual memory subsystem is called to release the pages of the virtual address range associated with range lock (I,J). This unlock function is called with the Process Identifier and the Virtual Page Range corresponding to this range lock as parameters. In step 516 the virtual memory subsystem is called to release the entry in the physical page list. This step is performed if supported and as required. This step releases the physical pages, if possible. In step 518 the physical memory associated with the range lock (I,J) itself is released. Next, control moves back to step 506 in order to process the next range lock.

It should be appreciated that the heuristic used to determine when to unlock a region of memory and free up the space indicated by a range lock may be any suitable one. For example, the above technique determines that memory should be released when both counters equal zero. However, memory may be marked for release when both counters are relatively low numbers compared to other counters, or when one is zero and the other non-zero. In general, the memory associated with a range lock may be released when the combination of counters indicate that this region of virtual memory is not as critical to retain in physical memory as another region and when the Usage Counter is zero.

In addition, it may be possible that a region or set of pages of virtual memory are locked by more than one process. In this case, a page may be the subject of a lock by more than one process, and thus, two or more range locks may correspond to this page. In other words, these range locks may overlap. In this example, each range lock will independently represent a separate lock upon virtual memory. In order for pages to be released by the virtual memory unlock function of step 514, then, each range lock that overlaps these pages must be determined to be suitable for deletion. As discussed above, if each of these overlapping range locks has counters equal to zero then the page range may be released.

Figure 9:
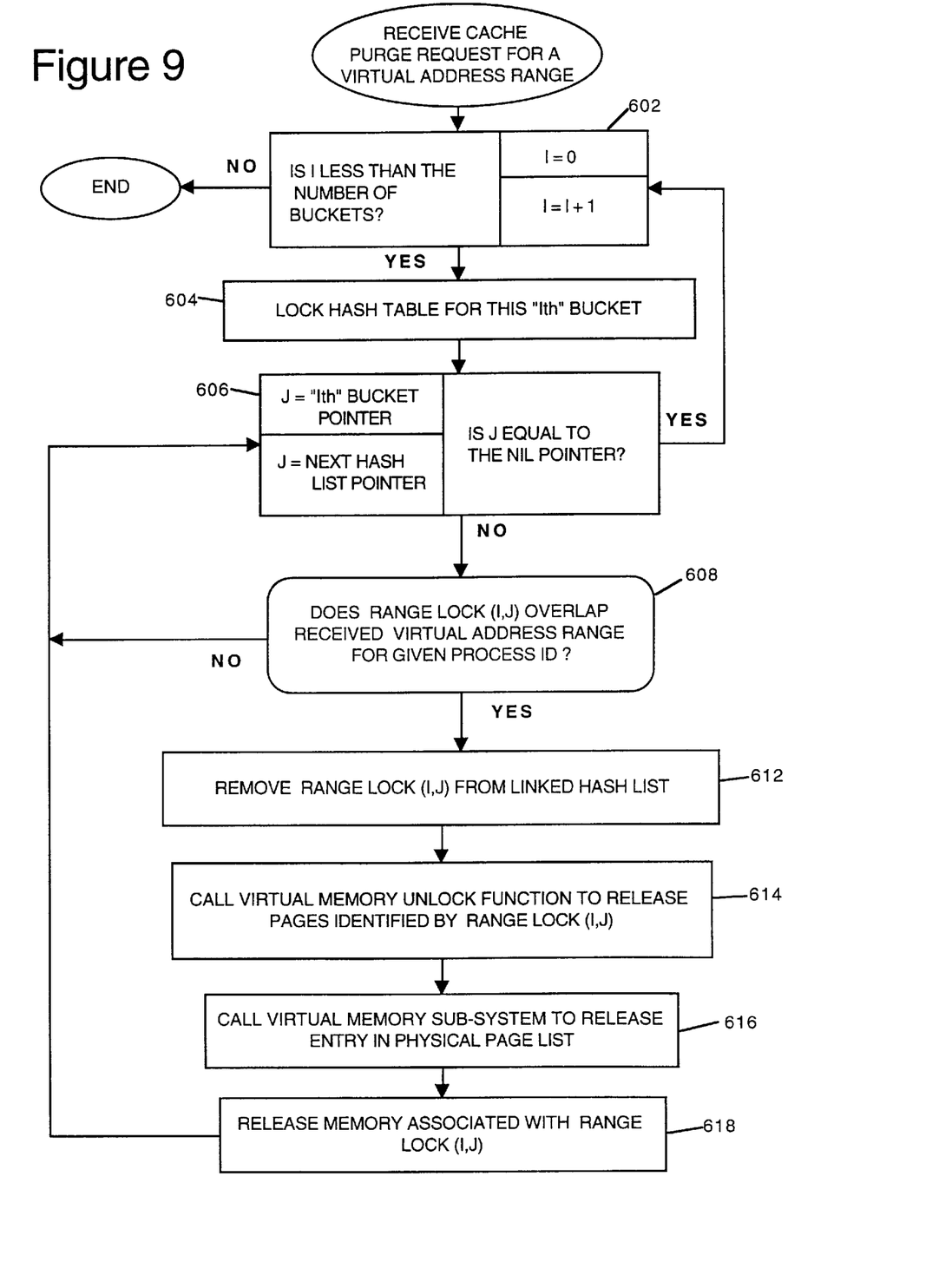
FIG. 9 is a flow chart for removing a virtual memory lock upon a range of virtual memory due to the release of a region of virtual memory by a process.

FIG. 9 illustrates a procedure for unlocking a region of virtual memory in response to the release of pages within virtual memory be a process. This procedure releases an I/O lock on virtual memory for a given virtual address range. Included with this request are the parameters Process Identifier and a corresponding Virtual Address Range that the process wishes to release. The looping constructs are similar to those described above with reference to FIG. 8.

This procedure steps through each of the range locks represented in the hash table and will remove a virtual memory lock and delete the corresponding range lock for that range that overlaps the requested Virtual Address Range. For example, if the purge request for the Virtual Address Range stretches from midway through page 2 to midway through page 8, any range lock that indicates a corresponding lock on pages 2 through 8 will be a range lock that overlaps the requested range. Even if the range lock indicates a locked range from page 1 through page 10, this range lock still overlaps the requested range and it will be removed. Step 602 initiates a looping structure with an index I that will step through each of the buckets of the has table. The index I begins at 0 and corresponds to a bucket number on each iteration of the loop. There will be N buckets labeled from 0 to N−1; therefore, when I is equal to N this procedure will end.

In step 604 the hash table at the current bucket number is locked by setting the mutex lock variable to "locked." The current bucket number may be determined by reference to the index I. After step 604 a second looping structure at step 606 is initiated that will step through each of the range locks within the current bucket number. In step 606 the pointer J is first initialized to the Bucket Pointer for the current bucket number. This index J will be incremented after each iteration by setting J equal to the next Hash List Pointer of the current range lock. Once this loop has reached the last range lock for the current bucket then the Hash List Pointer will be nil, this loop will terminate and control will move back up to step 602 where the index I is incremented and the next bucket of the hash table will be processed.

The loop initiated by step 606 begins at a first step 608. The current range lock being processed may be identified with reference to both of the indexes I and J. For example, the current range lock may be identified by range lock (I,J), where the index I refers to a bucket of the hash table and the pointer J points to a range lock within that bucket. Step 608 tests whether the Virtual Page Range for range lock (I,J) overlaps at all with the received Virtual Address Range for the given Process Identifier. If not, then control moves back up to step 606. If so, control moves to step 612. In other words, does the Virtual Page Range overlap the pages associated with Virtual Address Range.

Accordingly, first in step 612 this range lock (I,J) is removed from the linked hash list. Next, in step 614 the unlock function of the virtual memory subsystem is called to release the pages of the virtual address range associated with range lock (I,J). This unlock function is called with the Process Identifier and the Virtual Page Range corresponding to this range lock as parameters. In step 616 the virtual memory subsystem is called to release the entry in the physical page list. This step is performed if supported and as required. This step releases the physical pages, if possible. In step 618 the physical memory associated with the range lock (I,J) itself is released. Next, control moves back to step 606 in order to process the next range lock. This procedure may also be optimized by determining when all of the pages associated with the Virtual Address Range have been unlocked, and then terminating the loop at that point.

The present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, the present invention further relates to computer readable media that include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that can be executed by the computer using an interpreter.

Figure 10:
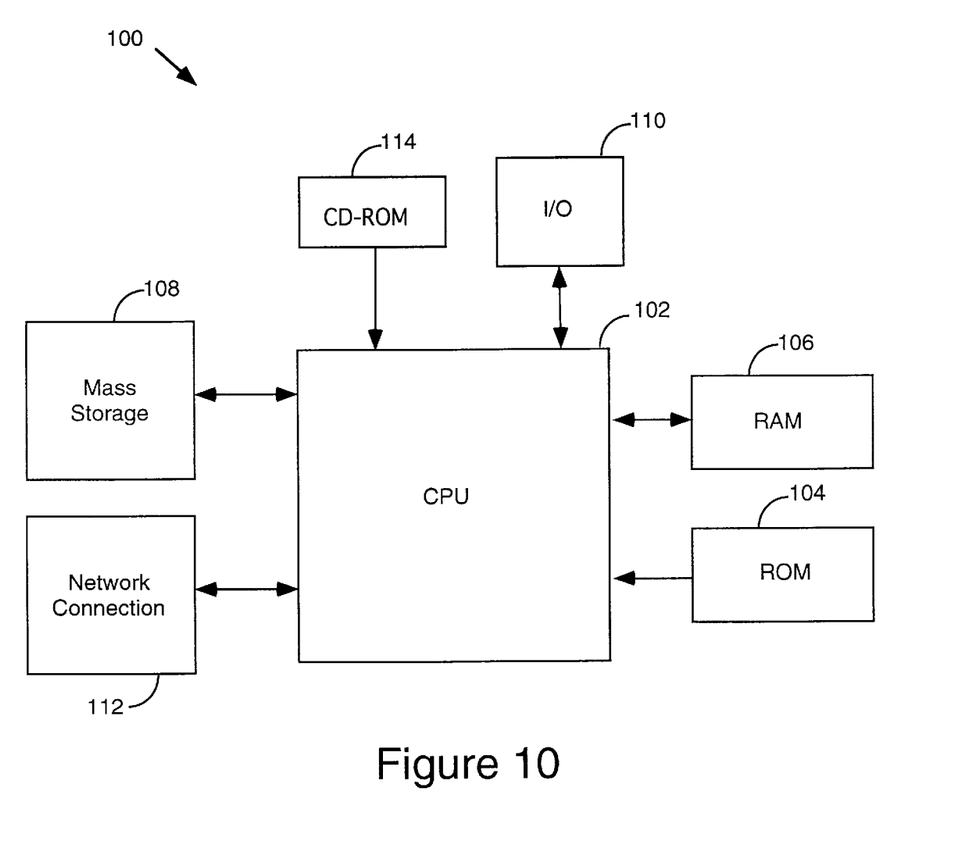
FIG. 10 shows a typical computer-based system for use in accordance with the present invention.

FIG. 10 illustrates a typical computer system in accordance with the present invention. The computer system 100 includes a central processing unit 102 (CPU) that is coupled to memory devices including read only memory 104 (ROM) and random access memory 106 (RAM). As is well known in the art, ROM 104 acts to transfer data and instructions uni-directionally to the CPU and RAM 106 is used typically to transfer data and instructions in a bi-directional manner. A mass memory device 108 is also coupled bi-directionally to CPU 102 and provides additional data storage capacity. The mass memory device 108 may be used to store programs, data and the like and may take the form of a magnetic or paper tape reader or some other well-known device. It will be appreciated that the information retained within the mass memory device 108, may, in appropriate cases, be incorporated in standard fashion as part of RAM 106 as virtual memory. A specific mass storage device such as a DC-ROM 114 may also pass data uni-directionally to the CPU.

CPU 102 is also coupled to one or more input/output devices 110 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, or course, other computers. Finally, CPU 102 optionally can be coupled to a computer or telecommunications network using a network connection as shown generally at 112. With such a network connection, it is contemplated that the CPU might receive information from the network, or might output information to the network in the course of performing the above-described method steps. The above-described devices and materials will be familiar to those of skill in the computer hardware and software arts.

Although the foregoing invention has been described in detail for purposes of clarity of understanding, it will be apparent that certain changes and modifications may be practiced within the scope of the claims. For instance, the symbolic nature of a range lock may be represented in other data structures than the specific ones described above without departing from the intent and scope of the invention. Also, the range locks may be stored and accessed in manners other than by using a hash table. For example, any suitable array, table structure, linked list or tree structure may be employed. And specifically, the range locks may be stored using a flexible range lock technique as explained above. Therefore, the described embodiments should be taken as illustrative and not restrictive, and the invention should not be limited to the details given herein but should be defined by the following claims and their full scope of equivalents.

We claim:

1. A computer-implemented method of placing a lock upon a region of physical memory within a computer system in response to an input/output (I/O) request, the method comprising:

receiving a virtual memory I/O request that includes a virtual address range corresponding to a region in virtual memory of the computer system, the virtual memory being distinct from the physical memory and the computer system having a facility for creating a plurality of range locks, each range lock representing corresponding pages of virtual memory that are present in the physical memory and that are locked in the physical memory, the virtual memory I/O request normally resulting in a virtual memory lock occurring;

identifying a virtual page range that includes the requested virtual address range and identifies at least one page of virtual memory;

determining whether a range lock exists that represents the identified virtual page range; and wherein when it is determined that a range lock exists that represents the identified virtual page range, the method further comprises incrementing a usage counter associated with the range lock in order to indicate that the I/O request is now outstanding for the identified virtual page range, the usage counter indicating the number of outstanding I/O requests for the virtual page range and the range lock existing when the usage counter is greater than or equal to zero, whereby a virtual memory lock is avoided for a subsequent virtual memory I/O request for the virtual address range.

2. A method as recited in claim 1 wherein when it is determined that a range lock does not exist that represents the virtual page range, the method further comprises the steps of:

applying a virtual memory lock function to the virtual page range in order to lock the pages of virtual memory that are identified by the virtual page range in the physical memory;

creating a first range lock that represents the virtual page range.

3. A method as recited in claim 2 wherein the first range lock includes a physical page list pointer that indicates the physical pages in physical memory corresponding to the virtual page range and the method further comprises the step of returning the physical page list pointer.

4. A method as recited in claim 1 wherein the plurality of range locks in the computer system are organized using a hash table having a plurality of buckets, each bucket being arranged to indicate a distinct subset of the plurality of range locks, and the step of determining whether a range lock exists includes the sub-steps of:

computing a hash function based at least partially upon a portion of the requested virtual address range, the hash function returning a hash function result indicating one of the plurality of buckets; and searching a first subset of the plurality of range locks corresponding to the bucket indicated by the hash function result.

5. A computer-implemented method of placing a lock upon a region of physical memory within a computer system in response to an input/output (I/O) request, the method comprising:

receiving a virtual memory I/O request that includes a virtual address range corresponding to a region in virtual memory of the computer system, the virtual memory being distinct from the physical memory and the computer system having a virtual memory lock function operative to lock pages of virtual memory in the physical memory of the computer system, the computer system also having a facility for creating a plurality of range locks, each range lock representing corresponding pages of virtual memory that are present in the physical memory and that are locked in the physical memory, the virtual memory I/O request normally resulting in a virtual memory lock occurring;

identifying a virtual page range that includes the requested virtual address range and identifies at least one page of virtual memory;

determining whether a range lock exists that represents the identified virtual page range, wherein when it is determined that a range lock does not exist that represents the virtual page range, the method further comprises, applying the virtual memory lock function to the virtual page range in order to lock the pages of virtual memory that are identified by the virtual page range in the physical memory, the virtual memory lock function being operative to force a continuous assignment of a first group of physical memory pages to the pages of virtual memory that are identified by the virtual page range on a one-to-one basis, and creating a first range lock that represents the virtual page range, the first range lock having a usage counter indicating the number of outstanding I/O requests for the virtual page range and the first range lock existing when the usage counter is greater than or equal to zero, whereby a virtual memory lock is avoided for a subsequent virtual memory I/O request for the virtual address range.

6. A method as recited in claim 5 wherein the step of applying a virtual memory lock function further includes the sub-steps of:

determining whether a set of pages of virtual memory included within the virtual page range have already been locked into physical memory by the virtual memory lock function; and wherein when it is determined that a set of pages of virtual memory included within the virtual page range have already been locked into physical memory, the step of applying a virtual memory lock function operates to avoid locking the set of pages that have already been locked.

7. A method as recited in claim 5 further including the step of determining whether the step of applying a virtual memory lock function has succeeded.

8. A method as recited in claim 5 wherein the first range lock includes a physical page list pointer that indicates the physical pages in physical memory corresponding to the virtual page range and the method further comprises the step of returning the physical page list pointer.

9. A method as recited in claim 5 wherein the plurality of range locks in the computer system are organized using a hash table having a plurality of buckets, each bucket arranged to indicate a distinct subset of the plurality of range locks, and the step of determining whether a range lock exists includes the sub-steps of:

computing a hash function based partially upon a portion of the requested virtual address range, the hash function returning a hash function result indicating one of the plurality of buckets; and searching a first subset of the plurality of range locks corresponding to the bucket indicated by the hash function result.

10. A computer-implemented method of processing an input/output (I/O) completion notification received by a virtual memory sub-system within a computer system, the I/O completion notification corresponding to an original I/O request, the method comprising:

receiving a virtual memory I/O request that includes a virtual address range corresponding to a region in virtual memory of the computer system, the virtual memory being distinct from the physical memory and the computer system having a facility for creating a plurality of range locks, each range lock representing corresponding pages of virtual memory that are present in the physical memory and that are locked in the physical memory, the virtual memory I/O request normally resulting in a virtual memory unlock occurring;

identifying a virtual page range that includes the requested virtual address range and identifies at least one page of virtual memory;

determining whether a range lock exists that represents the identified virtual page range; and     wherein when it is determined that a range lock exists that represents the identified virtual page range, the method further comprises decrementing a usage counter associated with the range lock in order to indicate that the I/O request is no longer outstanding for the identified virtual page range, the usage counter indicating the number of outstanding I/O requests for the virtual page range and the range lock existing when the usage counter is greater than or equal to zero, whereby a virtual memory unlock is avoided for the virtual memory I/O request for the virtual address range.

11. A method as recited in claim 10 wherein the plurality of range locks in the computer system are organized using a hash table having a plurality of buckets, each bucket arranged to indicate a distinct subset of the plurality of range locks, and the step of determining whether a range lock exists includes the sub-steps of:

computing a hash function based partially upon a portion of the requested virtual address range, the hash function returning a hash function result indicating one of the plurality of buckets; and     searching a first subset of the plurality of range locks corresponding to the bucket indicated by the hash function result.

12. A computer-implemented method of removing a lock upon a region of physical memory within a computer system in response to a cache purge request, the method comprising:

receiving a cache purge request in a computer system having virtual memory distinct from the physical memory, the computer system having a facility for creating a plurality of range locks, each range lock representing corresponding pages of virtual memory that are present in the physical memory and that are locked in the physical memory;

identifying a first range lock having a virtual page range corresponding to a set of virtual memory pages, the first range lock having a usage counter indicating the number of outstanding I/O requests for the virtual page range and the first range lock existing when the usage counter is greater than or equal to zero;

determining whether the set of virtual memory pages that are locked in physical memory should be unlocked by determining that the usage counter of the range lock is zero; and     wherein when it is determined that the set of virtual memory pages that are locked in physical memory should be unlocked the method further comprises:

applying a virtual memory unlock function to the virtual page range in order to unlock the pages of virtual memory that are identified by the virtual page range in the physical memory, and     releasing the portion of physical memory that is occupied by the first range lock.

13. A method as recited in claim 12 wherein the cache purge request is in response to a low memory condition of the computer system and the step of determining whether a set of virtual memory pages that are locked in physical memory should be unlocked includes the step of determining whether a range lock exists having an associated usage counter that indicates that relatively few I/O operations are outstanding for the set of virtual memory pages that correspond to the existing range lock.

14. A method as recited in claim 13 wherein the step of determining whether a set of virtual memory pages that are locked in physical memory should be unlocked further includes the step of determining whether a range lock exists having an associated timer reference counter that indicates that relatively few I/O operations have been performed over a period of time using the set of virtual memory pages that correspond to the existing range lock.

15. A method as recited in claim 12 wherein the cache purge request is in response to a request to unlock a first virtual address range, and the step of determining whether a set of virtual memory pages that are locked in physical memory should be unlocked includes the step of determining whether said set of virtual memory pages overlap with said first virtual address range.

16. A method as recited in claim 12 wherein the plurality of range locks in the computer system are organized using a hash table having a plurality of buckets, each bucket arranged to indicate a distinct subset of the plurality of range locks, and the step of determining whether a set of virtual memory pages that are locked in physical memory should be unlocked includes the sub-steps of:

updating a bucket counter to indicate a current one of the plurality of buckets, and     searching a first subset of the plurality of range locks corresponding to the current bucket indicated by the bucket counter.

17. A range lock data structure embodied in a computer-readable medium, the range lock data structure being arranged for use in implementing a virtual memory sub-system of a computer system, the computer system having physical memory and virtual memory distinct from the physical memory, the range lock representing a virtual page range that identifies one or more pages of virtual memory that are present in the physical memory and that are locked in the physical memory, the range lock comprising:

a process identifier indicative of the computer process to which the virtual pages correspond;

a virtual pages identifier indicative of the virtual pages of virtual memory that are locked in the physical memory;

a physical page list identifier indicative of those physical pages in physical memory that correspond to the virtual pages of virtual memory; and     a usage counter indicative of the number of outstanding input/output operations associated with the physical pages, the range lock data structure existing when the usage counter is greater than or equal to zero.

18. A computer apparatus for use in implementing a virtual memory sub-system of a computer system, the computer apparatus comprising:

a central processing unit;

random access memory in communication with the central processing unit;

a mass storage device in communication with the central processing unit wherein the random access memory includes a data structure as recited in claim 17.

19. A computer program product comprising a computer-usable medium having computer-readable code embodied thereon for placing a lock upon a region of physical memory within a computer system in response to an input/output (I/O) request, the computer program product comprising computer-readable program code for effecting the following within the computer system:

receiving a virtual memory I/O request that includes a virtual address range corresponding to a region in virtual memory of the computer system, the virtual memory being distinct from the physical memory and the computer system having a facility for creating a plurality of range locks, each range lock representing corresponding pages of virtual memory that are present in the physical memory and that are locked in the physical memory, the virtual memory I/O request normally resulting in a virtual memory lock occurring;

identifying a virtual page range that includes the requested virtual address range and identifies at least one page of virtual memory;

determining whether a range lock exists that represents the identified virtual page range; and wherein when it is determined that a range lock exists that represents the identified virtual page range, the method further comprises incrementing a usage counter associated with the range lock in order to indicate that the I/O request is now outstanding for the identified virtual page range, the usage counter indicating the number of outstanding I/O requests for the virtual page range and the range lock existing when the usage counter is greater than or equal to zero, whereby a virtual memory lock is avoided for a subsequent virtual memory I/O request for the virtual address range.

20. A computer program product as recited in claim 19 wherein when it is determined that a range lock does not exist that represents the virtual page range, the computer program product further comprises code for:

applying a virtual memory lock function to the virtual page range in order to lock the pages of virtual memory identified by the virtual page range in the physical memory;

creating a first range lock that represents the virtual page range.

21. A computer program product as recited in claim 20 wherein the first range lock includes a physical page list pointer that indicates the physical pages in physical memory corresponding to the virtual page range and the computer program product further comprises code for returning the physical page list pointer.

22. A computer program product as recited in claim 19 wherein the plurality of range locks in the computer system are organized using a hash table having a plurality of buckets, each bucket arranged to indicate a distinct subset of the plurality of range locks, and the step of determining whether a range lock exists includes the sub-steps of:

computing a hash function based partially upon a portion of the requested virtual address range, the hash function returning a hash function result indicating one of the plurality of buckets; and searching a first subset of the plurality of range locks corresponding to the bucket indicated by the hash function result.

23. A computer-implemented method of transmitting the computer-readable program code as recited in claim 19, the method comprising the steps of:

storing the program code onto a computer-usable medium;

receiving a request for the transmission of the program code; and transmitting the program code over a network to a remote location.

24. A computer program product comprising a computer-usable medium having computer-readable code embodied thereon for placing a lock upon a region of physical memory within a computer system in response to an input/output (I/O) request, the computer program product comprising computer-readable program code for effecting the following within the computer system:

receiving a virtual memory I/O request that includes a virtual address range corresponding to a region in virtual memory of the computer system, the virtual memory being distinct from the physical memory and the computer system having a virtual memory lock function operative to lock pages of virtual memory in the physical memory of the computer system, the computer system also having a facility for creating a plurality of range locks, each range lock representing corresponding pages of virtual memory that are present in the physical memory and that are locked in the physical memory, the virtual memory I/O request normally resulting in a virtual memory lock occurring;

identifying a virtual page range that includes the requested virtual address range and identifies at least one page of virtual memory;

determining whether a range lock exists that represents the identified virtual page range, wherein when it is determined that a range lock does not exist that represents the virtual page range, the method further comprises, applying the virtual memory lock function to the virtual page range in order to lock the pages of virtual memory that are identified by the virtual page range in the physical memory, the virtual memory lock function operative to force a continuous assignment of a first group of physical memory pages to the pages of virtual memory that are identified by the virtual page range on a one-to-one basis, and creating a first range lock that represents the virtual page range, the first range lock having a usage counter indicating the number of outstanding I/O requests for the virtual page range and the first range lock existing when the usage counter is greater than or equal to zero, whereby a virtual memory lock is avoided for a subsequent virtual memory I/O request for the virtual address range.

25. A computer program product as recited in claim 24 wherein the step of applying a virtual memory lock function further includes the sub-steps of:

determining whether a set of pages of virtual memory included within the virtual page range have already been locked into physical memory by the virtual memory lock function; and wherein when it is determined that a set of pages of virtual memory included within the virtual page range have already been locked into physical memory, the step of applying a virtual memory lock function operates to avoid locking the set of pages that have already been locked.

26. A computer program product as recited in claim 24 further including code for determining whether the step of applying a virtual memory lock function has succeeded.

27. A computer program product as recited in claim 24 wherein the first range lock includes a physical page list pointer that indicates the physical pages in physical memory corresponding to the virtual page range and the computer program product further comprises code for returning the physical page list pointer.

* * * * *